(12) United States Patent
Rigolio et al.

(10) Patent No.: US 11,981,386 B2
(45) Date of Patent: May 14, 2024

(54) CONVERTIBLE REARVIEW MIRROR

(71) Applicant: RIZOMA IP S.R.L., Lonate Pozzolo (IT)

(72) Inventors: Fabrizio Rigolio, Gallarate (IT); Guglielmo Urso, Calco (IT); Eugenio Lodi, Chieti (IT); Mattia Rigoni, San Pietro di Feletto (IT)

(73) Assignee: Rizoma IP S.r.I., Lonate Pozzolo (IT)

( * ) Notice: Subject to any disclaimer, the term of this patent is extended or adjusted under 35 U.S.C. 154(b) by 548 days.

(21) Appl. No.: 17/158,826

(22) Filed: Jan. 26, 2021

(65) Prior Publication Data
US 2022/0119066 A1    Apr. 21, 2022

(30) Foreign Application Priority Data

Oct. 20, 2020    (IT) .................. 102020000024751

(51) Int. Cl.
*B62J 29/00*    (2006.01)

(52) U.S. Cl.
CPC .................... *B62J 29/00* (2013.01)

(58) Field of Classification Search
CPC .................... B62J 29/00; B60R 1/06
USPC ......................................... 359/842
See application file for complete search history.

(56) References Cited

U.S. PATENT DOCUMENTS

| | | | | |
|---|---|---|---|---|
| 4,715,681 A | * | 12/1987 | Johnson ............ | B62J 29/00 359/850 |
| 4,759,620 A | * | 7/1988 | Sakuma ............. | B60R 1/06 248/475.1 |
| 6,070,846 A | * | 6/2000 | Shimokobe ......... | B62J 29/00 248/646 |
| 7,007,998 B2 | * | 3/2006 | Toyofuku ........... | B62K 19/48 296/78.1 |
| 8,690,364 B2 | * | 4/2014 | Kobayashi .......... | B62J 29/00 359/872 |
| 2005/0237643 A1 | * | 10/2005 | Wu ................... | B62J 29/00 359/879 |
| 2008/0141821 A1 | | 6/2008 | Degarate et al. | |
| 2010/0188764 A1 | * | 7/2010 | Wu ................... | B62J 29/00 359/872 |

(Continued)

FOREIGN PATENT DOCUMENTS

| | | | |
|---|---|---|---|
| DE | 10235886 | * | 3/2003 |
| DE | 20 2017 001980 U1 | | 7/2018 |

(Continued)

OTHER PUBLICATIONS

Search Report dated Feb. 23, 2021, issued in connection with corresponding Italian Patent Application No. 202000024751.

(Continued)

*Primary Examiner* — Ricky D Shafer
(74) *Attorney, Agent, or Firm* — Akerman LLP (57) ABSTRACT

The present invention relates to a convertible rearview mirror comprising a fixed portion associable with an outer surface and a movable portion, connected to the fixed portion by means of a joint system. The movable portion is rotatable with respect to the fixed portion between a first rearview position and a second deflected position, about a rotation axis of the joint system. The movable portion further comprises at least one reflective surface. The present invention also relates to a motorcycle comprising said rearview mirror.

9 Claims, 4 Drawing Sheets

(56) References Cited

U.S. PATENT DOCUMENTS

| | | | | |
|---|---|---|---|---|
| 2011/0140471 A1* | 6/2011 | Suesse | ................. | B62J 29/00 |
| | | | | 296/1.11 |
| 2011/0299186 A1* | 12/2011 | Wu | ................. | B62J 29/00 |
| | | | | 359/872 |
| 2014/0118855 A1* | 5/2014 | Whinnery | ................. | B62J 29/00 |
| | | | | 359/842 |
| 2015/0307148 A1* | 10/2015 | Kato | ................. | G02B 5/08 |
| | | | | 359/842 |
| 2016/0236742 A1* | 8/2016 | Chen | ................. | B60Q 1/38 |
| 2022/0274527 A1* | 9/2022 | Stanger | ................. | B60R 1/076 |

FOREIGN PATENT DOCUMENTS

| | | |
|---|---|---|
| EP | 2 033 886 A2 | 3/2009 |
| EP | 3 072 791 A1 | 9/2016 |
| JP | H06 87378 A | 3/1994 |
| WO | 2019/035506 A1 | 2/2019 |

OTHER PUBLICATIONS

Search Report dated Feb. 23, 2021, issued in connection with corresponding European Patent Application No. 21153952.

* cited by examiner

CONVERTIBLE REARVIEW MIRROR

CROSS-REFERENCE TO RELATED APPLICATIONS

The present application claims priority to Italian Patent Application No. 102020000024751, filed on Oct. 20, 2020, the entirety of which is incorporated herein by reference.

FIELD OF APPLICATION

The present invention relates to a convertible rearview mirror and also to a motorcycle comprising said convertible rearview mirror.

The present invention is therefore preferably, but not exclusively, within the field of two-wheeled vehicles, mopeds and motorcycles, or particular three-wheeled vehicles, such as motor tricycles, or four-wheeled vehicles, such as quads.

PRIOR ART

The aforementioned technical field is often a harbinger of innovations connected to an always active research and development phase.

The vehicles belonging to the aforementioned field are therefore continuously developed and modified in all of their components in terms of shape, size or operation in search of a configuration that allows an improvement. This improvement can be related to vehicle performance, handling with particular attention to an overall lightening, or to a safety issue.

Researches and innovations are often diversified in two macro categories.

The first macro-category is that of road vehicles, in which it is often necessary to seek a compromise between the equipment obligations for a vehicle of this category and the search to optimize the performance features.

The second macro-category is that of track vehicles, in which everything is almost exclusively aimed at achieving optimal performance.

Even in this case, however, it is necessary to consider both the features closely related to this performance and a series of accessories that are in any case essential for the pilot, especially if he is not alone on the track.

However, these accessories are often poorly matched or in any case difficult to integrate in terms of functional features with the components aimed at performance optimization.

In addition, track vehicles are also sometimes converted into road vehicles, but this work cycle often leads to forced post-assembly, resulting in a rapid deterioration of the designed features.

Consequently, the need is felt to develop components and systems that can be adopted both on track vehicles and on road vehicles, which are harmonious and functional within the development of the vehicle and which therefore allow a correct design synergy between the very performance requirements and the accessory functional requirements.

This need is felt, for instance, with regard to rearview mirrors, which are devices adapted to increase driving safety by increasing the rear and side visibility of the driver of a vehicle.

These devices increase driving safety since they allow spending less time viewing other vehicles and reducing the blind spot, even if they cannot eliminate it. This allows maneuvers to be carried out with greater safety, thus reducing accidental accidents.

It would also be advantageous to be able to travel along motorway sections with a track vehicle, where however it is necessary to use rearview mirrors, which are not present on track vehicles.

Therefore, the technical problem of the present invention is to devise a component, specifically a rearview mirror, capable of carrying out an own accessory function for a driver without affecting, and preferably improving, the performance of the vehicle on which it is associated.

A further object is to make a component of simple functionality, so that it can be used without problems in the event of a stationary or moving vehicle.

Still a further object is to provide a component that may be adapted, by means of a small routine variation during the production phase, to any vehicle, in particular to a motorcycle.

A further object is to devise a component having an intuitive operation without the need for particular instructions for a user.

Finally, an object is to provide a component of relatively simple realization to facilitate the large-scale production thereof.

SUMMARY OF THE INVENTION

The solution idea to achieve the intended purposes is to provide a multifunctional rearview mirror capable of providing own basic rearview features, but also being suitable to act in a coordinated manner with the contingent performance needs of the vehicle whereon it is mounted.

Based on this solution idea, the technical problem is solved by a convertible rearview mirror comprising a fixed portion associable with an outer surface, specifically of a vehicle, and a movable portion, connected to said fixed portion by means of a joint system. The movable portion is rotatable with respect to the fixed portion between a first rearview position and a second deflected position, about a rotation axis of the joint system. The movable portion further comprises at least one reflective surface.

Advantageously, the present solution allows exploiting the rearview mirror for the rearview function in one position, but it also allows positioning it in a configuration that is substantially parallel to an air flow that hits it. In this latter configuration the reflective function is clearly not exploited, but the aerodynamic resistance or detachment problems of the flow in correspondence with a large discontinuity that occur with the rearview mirror in a transversal position with respect to the flow are avoided.

Preferably, the reflective surface has an aspherical conformation.

Advantageously, this conformation allows reducing the transversal dimensions of the rearview mirror without having an excessive reduction of the visibility ensured thereby.

Still preferably, the movable portion provides a thickness comprised between 2 mm and 15 mm.

Advantageously, clearly a reduced thickness, when the rearview mirror is in the second deflected position, leads to an even smaller contribution to aerodynamic resistance.

More preferably, the movable portion has an airfoil transversal section, adapted to generate an aerodynamic force when said movable portion is in the second deflected position.

Advantageously, said embodiment not only aims at reducing the drawbacks of aerodynamic nature, but also at providing a positive contribution to the overall aerodynamic features of the vehicle which the rearview mirror is associated with.

Still preferably, the reflective surface of the movable portion has an area comprised between 0.004 m² and 0.01 m².

Advantageously, the cross study of area and inclination, keeping in mind the basic principle of association of shape and function, allows obtaining an optimized general shape of the rearview mirror in both its operating positions, the first rearview position and the second deflected position.

Preferably, the rearview mirror provides for a longitudinal extension comprised between 0.15 m and 0.35 m.

Advantageously, this dimensional range falls within a perspective of optimizing visibility without running into problems of structural rigidity of the rearview mirror.

More preferably, the rearview mirror according to the invention is made of one or more materials selected from a metal material, a polymeric material, an elastomeric material, a ceramic material, a composite material, carbon fiber, wood.

Advantageously, these materials are optimal both in terms of lightness and functionality features of the rearview mirror, and in terms of durability and wear resistance, and in terms of production needs.

Still preferably, the convertible rearview mirror further comprises a mounting plate, removably connected to a connection surface of the fixed portion.

Nothing clearly prevents from having a mounting plate that is integral with the fixed portion. Moreover, nothing prevents, in an embodiment, from providing a connection surface that is directly connected to an outer surface without interposition of any mounting plate.

Furthermore, according to some embodiments, an additional sealing element is provided between the fixed portion and the outer surface whereon it is connected.

Advantageously, said solution allows an optimized coupling and a reduction of the problems of damage upon assembly or of wear between the rearview mirror and the vehicle whereon it is associated.

Preferably, the joint system comprises a rotation pin.

Advantageously, the present solution is easy to make and allows a functionality that is suitable for the required function.

According to another aspect of the present invention, there is provided a motorcycle comprising a motorcycle front portion and at least one rearview mirror connected to said motorcycle front portion and made according to what has been described above.

Advantageously, said solution allows a configuration variation of the rearview mirror of a motorcycle according to the needs.

Still advantageously, this solution may also allow to modify the aerodynamic features of the motorcycle according to the specific needs present in track or road configuration.

The features and advantages of the convertible rearview mirror according to the present invention will become clearer from the following description of an embodiment thereof given by way of non-limiting example with reference to the enclosed drawings.

DETAILED DESCRIPTION

Figure 1:
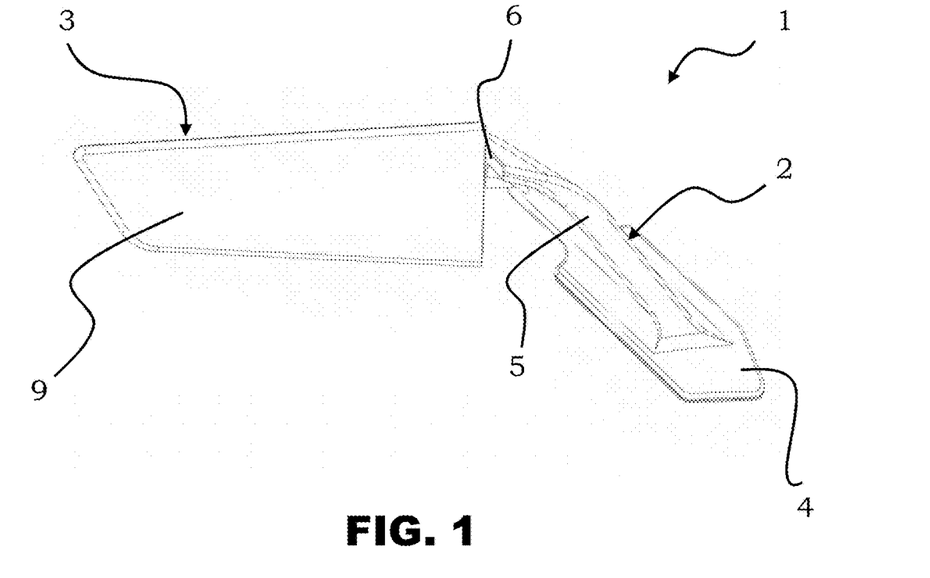
FIG. 1 represents a perspective view of a rearview mirror according to the invention in a first position.
Figure 2:
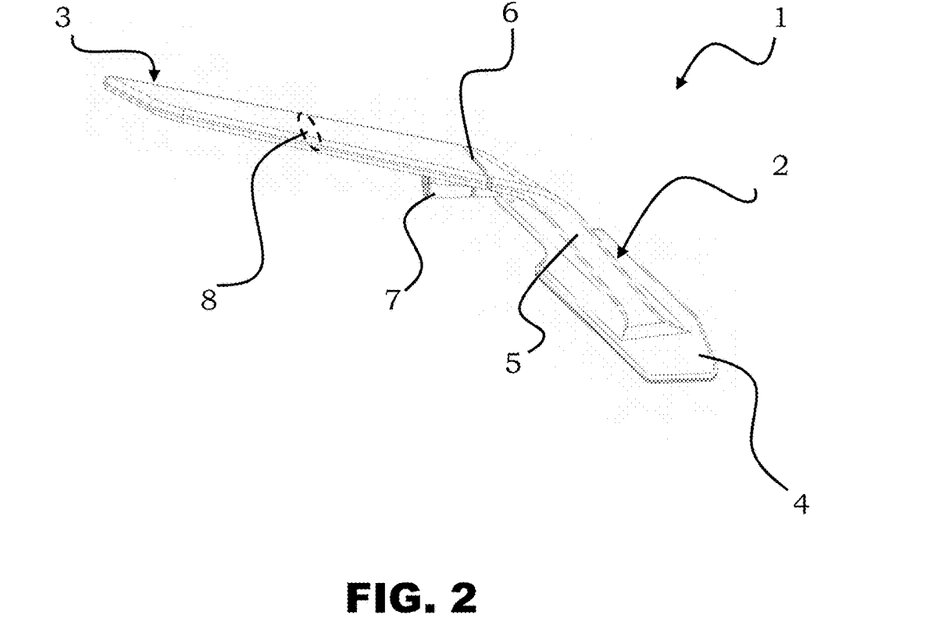
FIG. 2 represents a perspective view of the rearview mirror of FIG. 1 in a second position.

With reference to the figures, and particularly to FIGS. 1 and 2, reference number 1 globally and schematically indicates a convertible rearview mirror made according to the present invention.

The rearview mirror 1 comprises a fixed portion 2 and a movable portion 3.

The fixed portion 2 is adapted to be associated with a surface, preferably of a vehicle.

The fixed portion 2 thus comprises a base element 4 shaped so as to take up the profile of the surface whereon the rearview mirror 1 is associated.

With respect to the prior art configurations, the present solution also allows providing a specific realization for the surface whereon the rearview mirror 1 is mounted.

A structural element 5 integrally develops from the base element 4.

Generally, the surface whereon the rearview mirror 1 is mounted is a tilted surface, thus the structural element 5 of the fixed portion 2 provides a transversal section rotating about three ideal rotation axes, thus generating a substantially airfoil curved shape.

The structural element 5 stops at a rotation section 6.

A joint system 7 is provided at said rotation section 6 on a lower surface of the structural element 5.

Said joint system 7 connects the structural element 5 of the fixed portion 2 to the movable portion 3.

The movable portion 3 provides a trapezoidal shape with a flattened transversal section 8.

According to an embodiment, the transversal section 8 coincides with the rotation section 6 along its entire development along the movable portion 3.

However, nothing prevents from providing a transversal section 8 that varies from the rotation section 6 along said development, according to particular design and/or aerodynamic features which it is desired to confer to the movable part 3.

The movable portion 3 is adapted to rotate with respect to the fixed portion 2 between a first rearview position P1, visible in FIG. 1, and a second deflected position P2, visible in FIG. 2, about a rotation axis X of the joint system 7.

The rotation between the first position P1 and the second position P2 and vice versa is preferably performed manually by directly gripping the movable portion 3.

Nothing prevents from providing a kinematic system that allows performing at least one of the two operations semi-automatically.

The movable portion 3 comprises a reflective surface 9 such as to be faced towards a user when the movable portion is in a first position P1.

The reflective surface 9 may be made of any material that is suitable to provide a correct rearview to the user.

Furthermore, the reflective surface 9 may be connected by means of a removable coupling, for instance a snap or suction cup coupling, or a permanent one, for instance by welding, on the movable portion 3.

Nothing prevents from adopting adhesive solutions or by means of screws, or others.

The reflective surface 9 provides a preferably aspherical conformation.

In this way it is possible to reduce the dimension of the adopted reflective surface 9 by maintaining the best sharpness up to the edges of the field of vision and avoiding problems of spherical aberration.

Furthermore, in the preferred but not limited embodiment represented, looking specifically at the rearview mirror 1 in the second position P2, it is possible to see how the movable portion 3 develops as an extension to the structural element 5 of the fixed portion 2, tilted with respect to a horizontal plane whereon the rotation axis X of the joint system 7 lies.

Therefore, the rearview mirror 1 provides an overall height between the base element 4 and the end section of the movable part 3 comprised between 0.08 m and 0.18 m, preferably 0.11 m.

The selection of the inclination value allows maintaining correct visibility for the user in the first rearview position P1 and at the same time it allows a correct incidence with respect to the incident air flow in the second deflected position P2.

Figure 3:
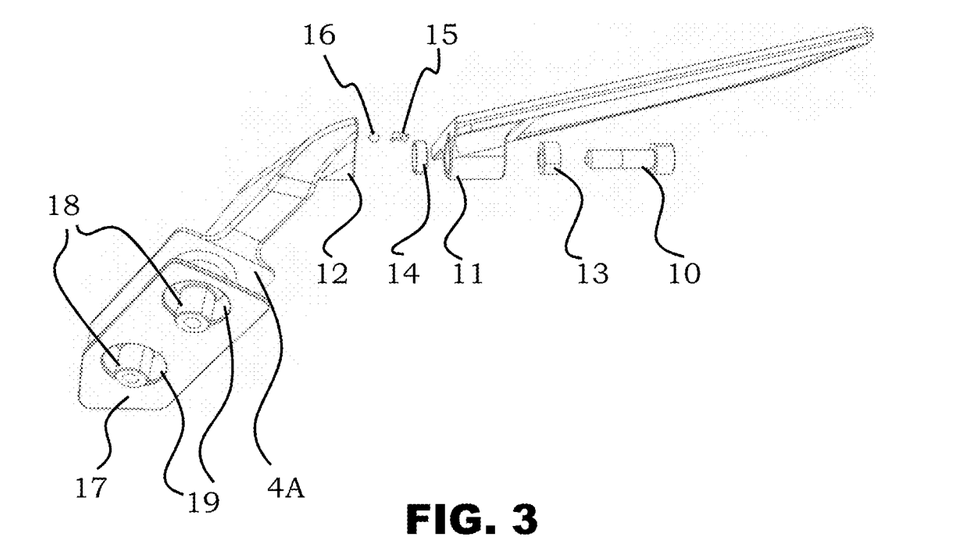
FIG. 3 represents an exploded view of the rearview mirror of FIG. 1.

As visible in the exploded view of the rearview mirror in FIG. 3, the joint system 7 in the represented exemplifying and non-limiting embodiment comprises a rotation pin 10 inserted through in an integrally made first seat 11, which protrudes from a lower surface of the fixed portion 2 and in an integrally made second seat 12, which protrudes from a lower surface of the movable portion 3. A first bushing 13 and a second bushing 14, which are interposed between the rotation pin 10 and the first seat 11 and the second seat 12, respectively, are preferably adopted.

Furthermore, the joint system 7 comprises a contrast spring 15 and a retaining ball 16 inserted in a suitable secondary seat (not shown) between the fixed portion 2 and the movable portion 3, adapted to allow the snap movement in the rotation of the rearview mirror 1 and maintaining a fixed configuration when it is in the first position P1 or in the second position P2.

Nothing prevents from providing a different joint system 7, for instance represented by a ball joint, or other variants, all falling within the scope defined by the enclosed claims.

Still furthermore, the rearview mirror 1 comprises a mounting plate 17, removably connected to a connection surface 4A of the base element 4 of the fixed portion 2.

The mounting plate 17 is then interposed between the connection surface 4A of the rearview mirror 1 and the surface of the component on which said rearview mirror 1 is installed. In this way a better seal during the connection phase and a protection from wear of both surfaces between which the connection base 17 is interposed are ensured.

In the present exemplifying embodiment, the rearview mirror 1 thus comprises a pair of fixing pins 18, which depart from the connection surface 4A to connect the rearview mirror 1 to the surface of the element whereon it is installed.

In this case clearly the mounting plate 17 provides two corresponding holes 19 through which the fixing pins 18 pass.

Nothing prevents from providing a different connection, for instance with anchoring elements placed on an external perimeter of the connection surface 4A, or an interlocking solution, all these variants of the rearview mirror 1 and consequently also of the mounting plate 17 being all within the scope defined by the enclosed claims.

Nothing further prevents from having a mounting plate 17 that is integral with the fixed portion 2, or also, in an alternative embodiment, from providing a connection surface 4A that is directly connected to an outer surface without interposition of any mounting plate 17.

Furthermore, according to some embodiments, an additional sealing element (not shown) is provided between the fixed portion 2 and the outer surface whereon it is connected.

Figure 4:
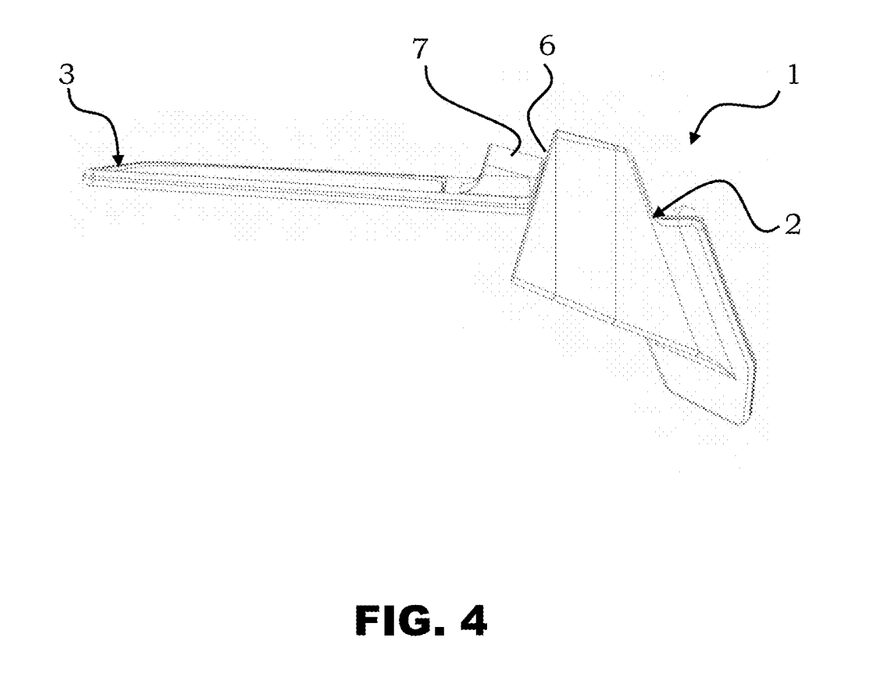
FIG. 4 represents an upper view of the rearview mirror of FIG. 1 in the first position.

As best seen in FIG. 4, the rearview mirror 1 has a thickness that is particularly reduced at the movable portion 3.

Preferably, the thickness of the flattened transversal section 8 of the movable portion 3 is comprised between 2 mm and 15 mm, more preferably between 3 mm and 8 mm, still more preferably it is equal to 5 mm.

In this way, when it is in the second position P2, the air flow that is incident on the rearview mirror generates a reduced resistance force and remains particularly attached to the hit surface.

As stated, said thickness may also be variable along the longitudinal extension of the movable part 3.

Furthermore, though in the embodiments illustrated in the figures, the movable part 3 has substantially straight sides, nothing prevents from using different shapes, in particular rounded or anyway curved, to realize the sides of such movable part 3.

Still furthermore, in a preferred embodiment, the rearview mirror 1 provides a transversal section with an airfoil profile so as to improve the aerodynamic performance of the rearview mirror 1.

In particular, already cataloged and classified airfoil profiles, symmetrical or asymmetrical, concave or concave-convex, may be adopted according to the aerodynamic features that it is desired to confer to the rearview mirror 1, specifically when it is in the second position P2.

In this way, the rearview mirror 1 facilitates the generation of an aerodynamic force which is added to the other components generated by other devices of the vehicle on which said rearview mirror 1 is engaged, acting in other words as an aerodynamic fin and improving the performance of the vehicle as a whole.

Of course, nothing prevents from providing shapes that are less conventional and less linked to codified aerodynamic principles of the rearview mirror 1, but simply focused on a reduction of the area hit by an incident air flow, these variants being included within the scope of the attached claims.

Figure 5:
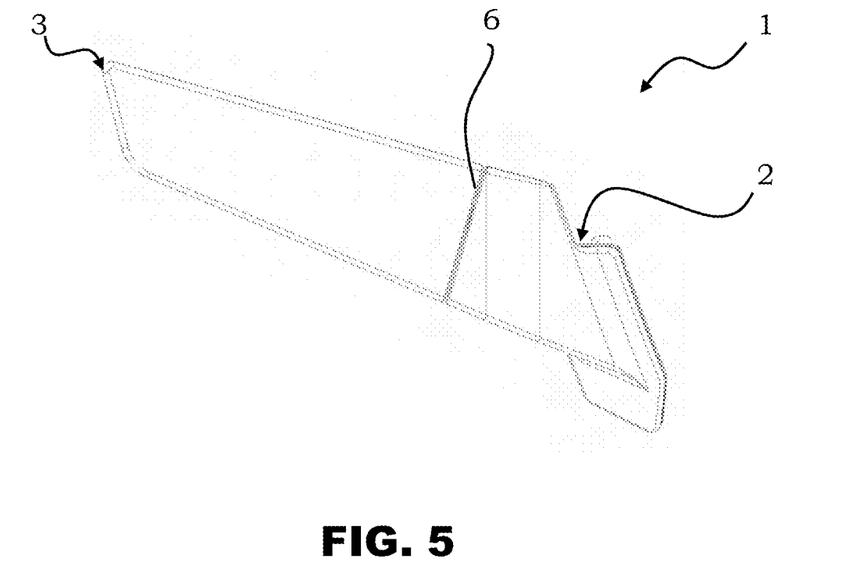
FIG. 5 represents an upper view of the rearview mirror of FIG. 1 in the second position.
Figure 6:
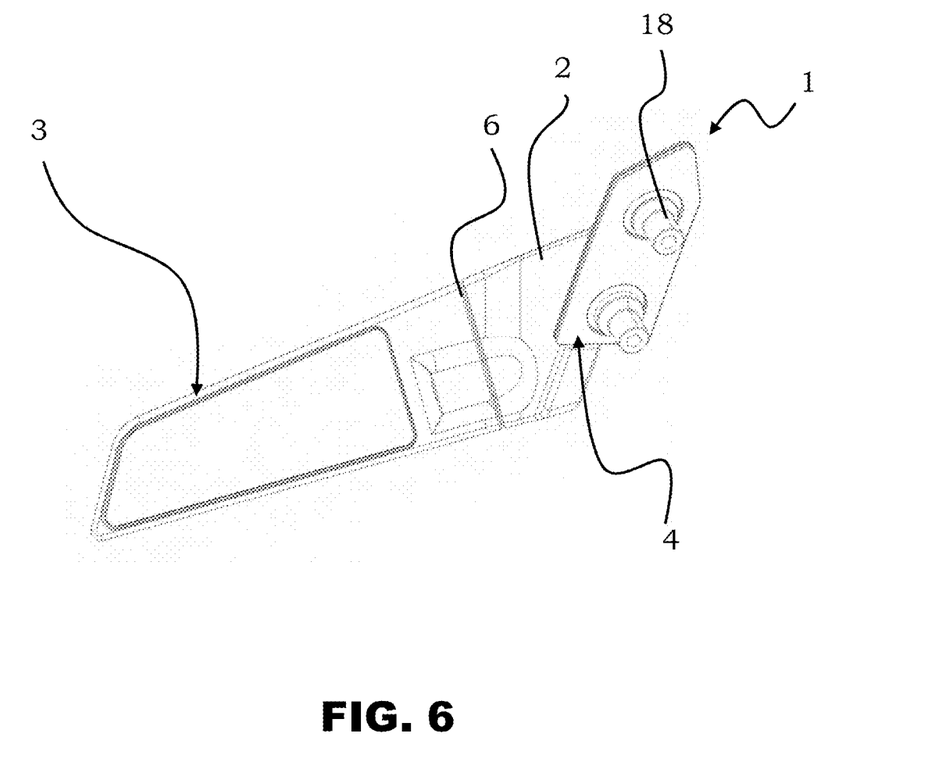
FIG. 6 represents a lower view of the rearview mirror of FIG. 1.

As most noticeable in FIGS. 5 and 6, preferably the rearview mirror 1 has a longitudinal extension comprised between 0.15 m and 0.35 m, preferably 0.21 m.

Still preferably, the movable portion 3 of the rearview mirror 1 has a longitudinal extension comprised between 0.07 m and 0,2 m, preferably 0.13 m.

Furthermore, in the represented embodiment the reflective surface 9 of the movable portion 3 has an area comprised between 0.004 $m^2$ and 0.01 $m^2$, according to the contingent needs of the vehicle whereon the rearview mirror 1 is installed.

The association between the evaluation of the area exposed to the incident air flow and the aforementioned inclination, in particular of the movable part 3, with respect to the axis of the joint system 7, allows optimizing the relationship between shape and function of the rearview mirror 1.

Still more specifically, an optimization is carried out both as regards the rearview features of the rearview mirror 1 in the first position P1 and as regards the incidence features on the aerodynamic features in the second position P2.

In fact, for instance, if on the one hand it must be considered that a larger rearview mirror allows for better rear visibility, on the other hand it is necessary to think about the second functionality provided for the rearview mirror 1.

On the other hand, the value of this longitudinal extension cannot be excessively reduced below a threshold value of the aforementioned dimensional range in order not to affect visibility.

Similar evaluations are carried out with regard to the area, in particular, of the movable portion 3, and the functional interactions between said longitudinal extension and area are also considered.

The convertible rearview mirror 1 is made of one or more materials selected from a metal material, a polymeric material, an elastomeric material, a ceramic material, carbon fiber, wood.

Nothing prevents the adoption of different materials, such as glass fiber or particular resins.

Different materials may be used for the fixed portion 2 and for the movable portion 3.

In a preferred embodiment the fixed portion 2 is made of aluminum.

In fact, said material meets both the need for structural strength that is necessary to counteract the stresses which a cantilevered element is subjected to in motion, and the need for the rearview mirror 1 to be durable over time and therefore less subjected to wear damage.

Nothing prevents the adoption of a different material, such as carbon fiber, also based on the cost requirements for the component and for the vehicle on which it is associated.

The movable portion 3, in the present embodiment, is made of aluminum in the same way as the fixed portion 2, thus providing the same guarantees in terms of strength and durability and also being optimal in terms of weight.

Nothing prevents from differently adopting a polymeric material, for instance, a technopolymer, which also ensures high performance in terms of lightness, resistance to wear and environmental conditions and therefore durability and reliability.

Also, nothing prevents the adoption of a material also in this case of fiber, or other materials such as steel, wood, glass, etc.

Figure 7:
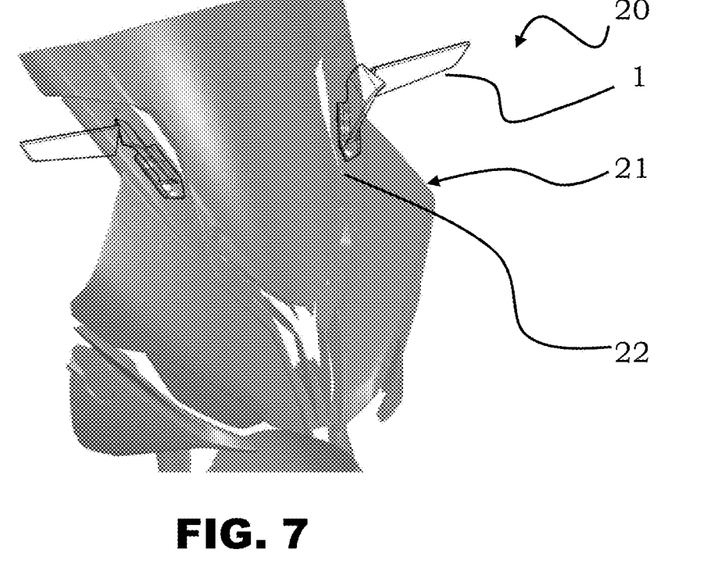
FIG. 7 represents a motorcycle portion comprising a rearview mirror according to the invention in a first position.
Figure 8:
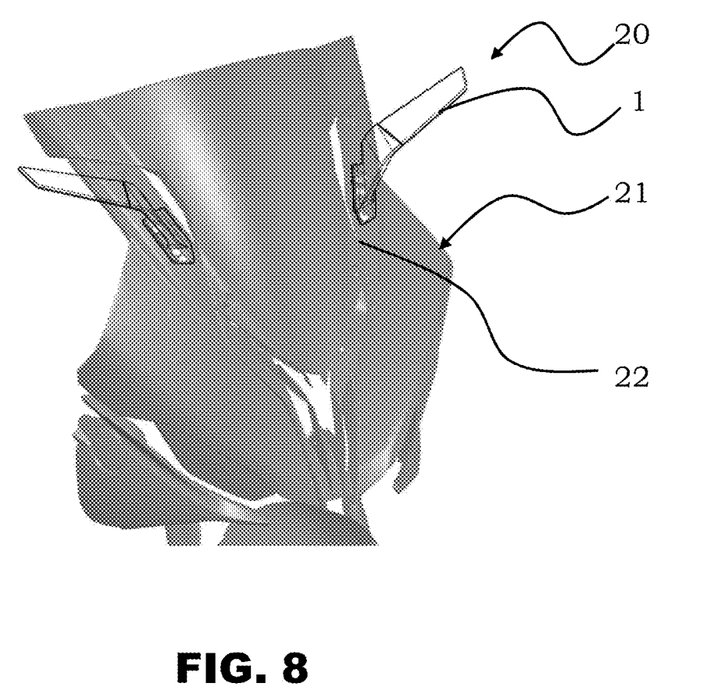
FIG. 8 represents the motorcycle portion of FIG. 7 comprising the rearview mirror according to the invention in a second position.

As visible in FIGS. 7 and 8, in a preferred embodiment the present invention provides a motorcycle 20 comprising a motorcycle front portion 21 whereon at least one rearview mirror 1 is installed, preferably, as represented, two rearview mirrors 1.

In the represented embodiment the rearview mirrors 1 are connected in particular to a front windshield 22 of the motorcycle.

Clearly nothing prevents a different arrangement also based on the various types of motorcycle, such as other positions on the fairing, directly in connection with the handlebar, or still others, generally included between the seat of the motorcycle up to the front end of the motorcycle itself.

In this purely motorcycle application, the convertible rearview mirror 1 may be used, for instance, to switch from a street configuration to a track configuration, by rotating the rearview mirror 1 between the first position P1 and the second position P2.

In the second position P2, depending on the selected inclination, on the installation position, on the thickness and on the longitudinal extension of the profile adopted, and on the shape of the transversal section, it may perform different functions in aerodynamic terms.

In fact, a shape and a position may be provided such as to increase the stability features of the motorcycle 20, also thinking in terms of the dihedral angle formed by the two rearview mirrors 1 in position P2, or different features aimed at generating a downforce vertical force on the front end of the motorcycle 20.

By virtue of these functions, a study in the wind tunnel of the rearview mirror 1 is therefore also provided for some embodiments, said rearview mirror 1 thus becoming an integral part of the motorcycle 20 with additional functions with respect to a simple appendix applied later. Clearly, other embodiments instead only perform a rearview function.

Advantageously, the present invention therefore allows providing a double functionality for a rearview mirror, maintaining its standard features but also providing an additional configuration that is suitable for different operating conditions.

A further advantage is found in the possibility of reducing the counterproductive effects of the presence of the rearview mirror in conditions of search for performance, providing, in some specific embodiments, also an improvement of the aerodynamic features of the vehicle on which this rearview mirror is installed.

Even a further advantage is given by the simplicity of use of the rearview mirror according to the invention, being able to switch between the configurations provided for even using one hand.

Finally, a further advantage is given by the simplicity of construction of the individual components of the rearview mirror, which is then simply assembled.

The skilled person will understand that the presented embodiment may be subjected to various changes and variations, according to specific and contingent needs, all within the scope of protection of the invention, as defined in the following claims.

For instance, as seen, it is possible to provide for different shape variants for the movable part according to the selected design and/or project features, or even different types of shapes of the connection surface of the fixed part, to adapt to different types of vehicle, and in particular of motorcycle, on which this rearview mirror may be installed.

What is claimed is:

1. A convertible rearview minor comprising:
    a fixed portion associable with an outer surface;
    a movable portion, connected to said fixed portion by a single joint system, said movable portion being rotatable with respect to said fixed portion between a first rearview position (P1) and a second deflected position (P2), about a rotation axis (X) of said single joint system, said movable portion further comprising at least one reflective surface, wherein the first rearview position (P1) is configured to cause the at least one reflective surface to face rearward towards a user of the minor, and wherein the second deflected position (P2) is configured to cause the at least one reflective surface to face downward;
    wherein said single joint system comprises:
        a rotation pin, wherein the rotation pin is positioned in a first seat that protrudes from a lower surface of the fixed portion, wherein the rotation pin is further positioned in a second seat that protrudes from a lower surface of the movable portion;
        a first bushing interposed between the rotation pin and the first seat;

a second bushing interposed between the rotation pin and the second seat;
a spring; and
a retaining ball.

2. The convertible rearview mirror according to claim 1, wherein said reflective surface has an aspherical shape.

3. The convertible rearview mirror according to claim 1, wherein said movable portion provides a thickness comprised between 2 mm and 15 mm.

4. The convertible rearview mirror according to claim 1, wherein said movable portion has an airfoil transversal section, adapted to generate an aerodynamic force when said movable portion is in said deflected second position (P2).

5. The convertible rearview mirror according to claim 1, wherein said reflective surface of said movable portion has an area comprised between 0.004 m$^2$ and 0.01 m$^2$.

6. The convertible rearview mirror according to claim 1, having a longitudinal extension comprised between 0.15 m and 0.35 m.

7. The convertible rearview mirror according to claim 1, wherein the fixed portion and the moveable portion are made of one or more materials selected from a metal material, a polymeric material, an elastomeric material, a ceramic material, carbon fiber, wood.

8. The convertible rearview minor according to claim 1, further comprising a mounting plate, removably connected to a connection surface of said fixed portion.

9. A motorcycle comprising a motorcycle front portion and at least one rearview minor connected to said motorcycle front portion and made according to claim 1.

\* \* \* \* \*